(12) United States Patent
Kuo

(10) Patent No.: US 7,192,167 B1
(45) Date of Patent: Mar. 20, 2007

(54) LAMP DEVICE

(76) Inventor: Benny L. Kuo, 2F, No. 174, Tung-Cheng St., Tainan City (TW)

( * ) Notice: Subject to any disclaimer, the term of this patent is extended or adjusted under 35 U.S.C. 154(b) by 0 days.

(21) Appl. No.: 11/288,886

(22) Filed: Nov. 28, 2005

(51) Int. Cl.
  *B60Q 3/04* (2006.01)
(52) U.S. Cl. .................. 362/362; 362/285; 362/287
(58) Field of Classification Search ................ 362/285, 362/287, 362, 427, 428, 434
  See application file for complete search history.

(56) References Cited

U.S. PATENT DOCUMENTS

| | | | | |
|---|---|---|---|---|
| 3,953,724 A * | 4/1976 | Ouchi | ......................... | 362/287 |
| 4,232,361 A * | 11/1980 | Kelsall | ....................... | 362/364 |
| 6,183,116 B1 * | 2/2001 | Harter et al. | ................ | 362/368 |
| 6,234,644 B1 * | 5/2001 | Kotovsky et al. | ........... | 362/148 |
| 6,471,374 B1 * | 10/2002 | Thomas et al. | ............. | 362/285 |
| 6,755,559 B2 * | 6/2004 | Wang et al. | ................ | 362/368 |
| 2002/0044443 A1 * | 4/2002 | Kira et al. | ................ | 362/153.1 |
| 2003/0103352 A1 * | 6/2003 | Yu | .............................. | 362/287 |
| 2006/0146542 A1 * | 7/2006 | Sullivan | ...................... | 362/362 |

* cited by examiner

*Primary Examiner*—Thomas M. Sember
*Assistant Examiner*—Adam C. Rehm
(74) *Attorney, Agent, or Firm*—Christie, Parker & Hale, LLP

(57) ABSTRACT

A lamp device includes a pivot ring disposed in a main sleeve and formed with two aligned first pivot shafts that extend radially and outwardly away from each other and that are mounted rotatably between the main sleeve and a rear connecting ring such that the pivot ring is pivotable relative to an assembly of the main sleeve and the rear connecting ring about the first pivot shafts. A lamp-mounting unit is disposed in the main sleeve, and is rotatable about two aligned second pivot shafts formed on the pivot ring and extending inwardly and radially toward each other and perpendicular to the first pivot shafts. A lamp unit is mounted fixedly on the lamp-mounting seat such that an assembly of the lamp-mounting seat and the lamp unit is pivotable relative to the pivot ring about the second pivot shafts.

9 Claims, 6 Drawing Sheets

US 7,192,167 B1

LAMP DEVICE

BACKGROUND OF THE INVENTION

1. Field of the Invention

The invention relates to a lamp device, more particularly to a lamp device that is to be partly embedded in a wall and that is operable so as to change orientation of a lamp unit thereof.

2. Description of the Related Art

A conventional lamp device, which is to be partly embedded in a wall or a ceiling, is used for projecting a light beam therefrom in a fixed direction. Activation of the conventional lamp device is controlled by an external control switch connected electrically thereto via wirings. As such, the conventional lamp device cannot project a light beam in a desired direction, and is inconvenient to use.

SUMMARY OF THE INVENTION

Therefore, the object of the present invention is to provide a lamp device that is operable so as to change orientation of a lamp unit thereof and that can be easily activated.

According to the present invention, a lamp device comprises:

a main sleeve having opposite front and rear axial ends;

a rear connecting ring mounted in the main sleeve;

a pivot ring disposed in the main sleeve and having an annular outer surface formed with two aligned first pivot shafts that extend radially and outwardly away from each other and that are mounted rotatably between the main sleeve and the rear connecting ring such that the pivot ring is pivotable relative to an assembly of the main sleeve and the rear connecting ring about the first pivot shafts, the pivot ring further having an annular inner surface formed with two aligned second pivot shafts that extend inwardly and radially toward each other and that are perpendicular to the first pivot shafts;

a lamp-mounting unit disposed in the main sleeve and rotatable about the second pivot shafts of the pivot ring; and a lamp unit disposed in the front axial end of the main sleeve and mounted fixedly on the lamp-mounting unit such that an assembly of the lamp-mounting unit and the lamp unit is pivotable relative to the pivot ring about the second pivot shafts.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
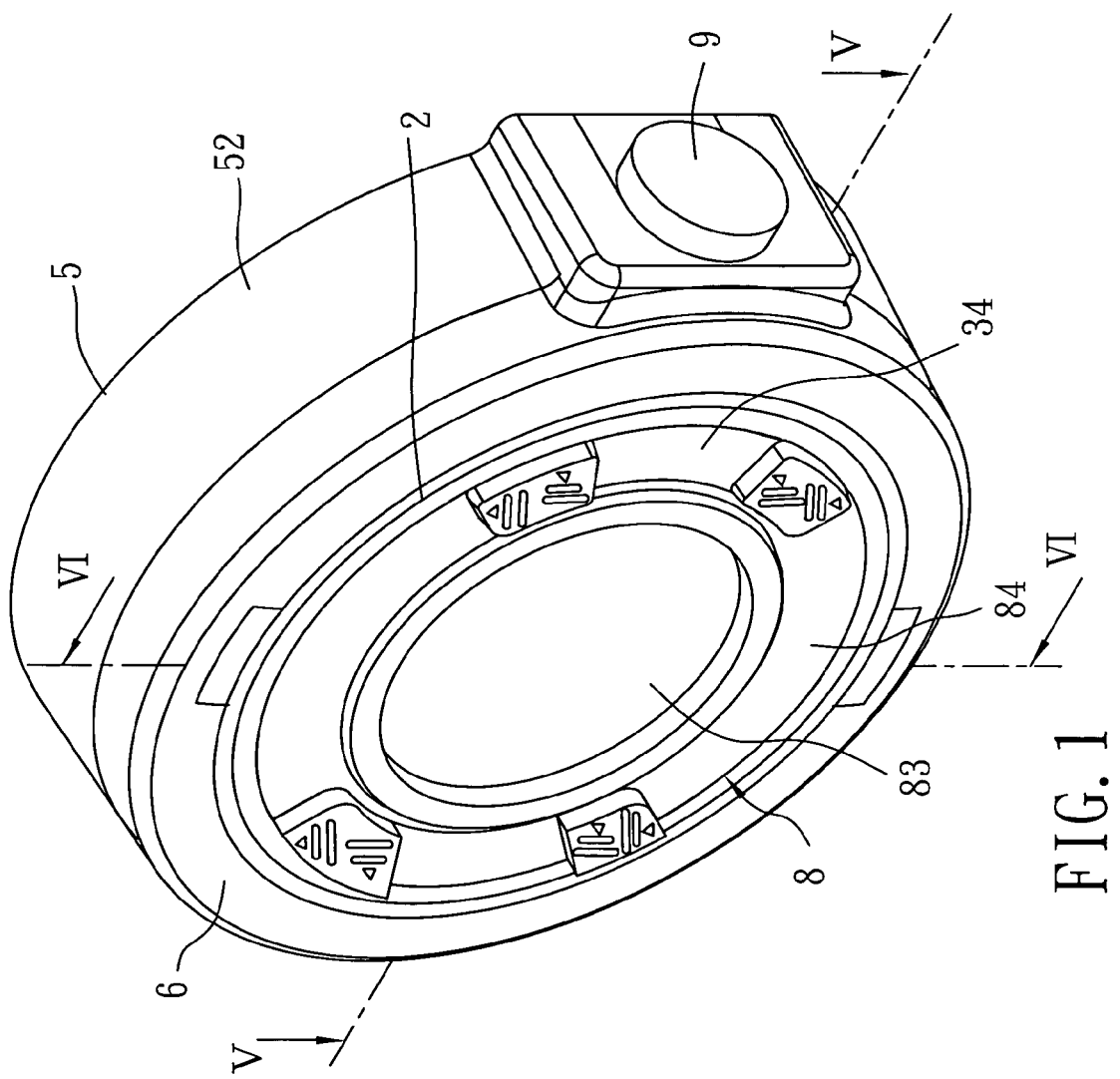
FIG. 1 is a perspective view showing the preferred embodiment of a lamp device according to the present invention.

Referring to FIGS. 1, 2, 5 and 6, the preferred embodiment of a lamp device according to the present invention is shown to include a main sleeve 5, a rear connecting ring 4, a pivot ring 2, a lamp-mounting unit 3, a lamp unit 8, a front decorative ring 6, and an activating unit 9. In this embodiment, the lamp device is adapted to be partly embedded in a wall (not shown).

Figure 2:
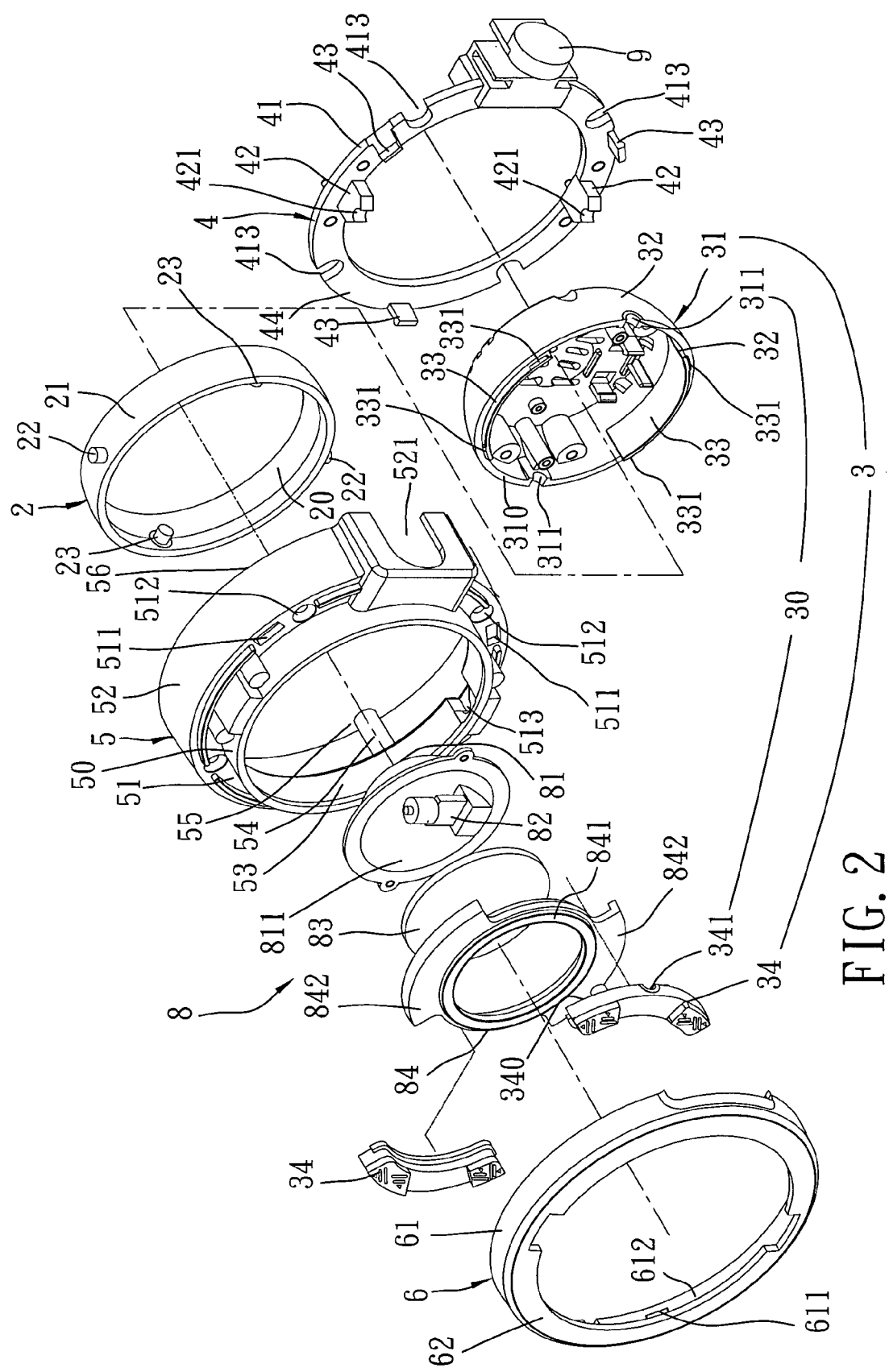
FIG. 2 is an exploded perspective view showing the preferred embodiment.

The main sleeve 5 has opposite front and rear axial ends 55, 56. In this embodiment, the main sleeve 5 has a smaller-diameter front end portion 50, a larger-diameter rear end portion 52 having an inner diameter larger than that of the front end portion 50, and an intermediate shoulder portion 51 interconnecting the front and rear end portions 50, 52. The front end portion 50 has an annular inner surface 53 formed with opposite recesses 513 that are disposed adjacent to the front axial end 55 of the main sleeve 5. The intermediate shoulder portion 51 has an annular rear surface formed with a plurality of hollow connecting rods 54 (only one is illustrated in FIG. 2) that are spaced apart from each other and that extend rearwardly. The intermediate shoulder portion 51 is formed with a plurality of through holes 511, and a plurality of threaded holes 512 aligned respectively with the connecting rods 54. As such, the main sleeve 5 is adapted to be fixed to the wall by means of a plurality of screw fasteners (not shown) that extend respectively through the threaded holes 512 and the connecting posts 54. The rear end portion 52 has a rear edge formed with a mounting groove 521.

Figure 5:
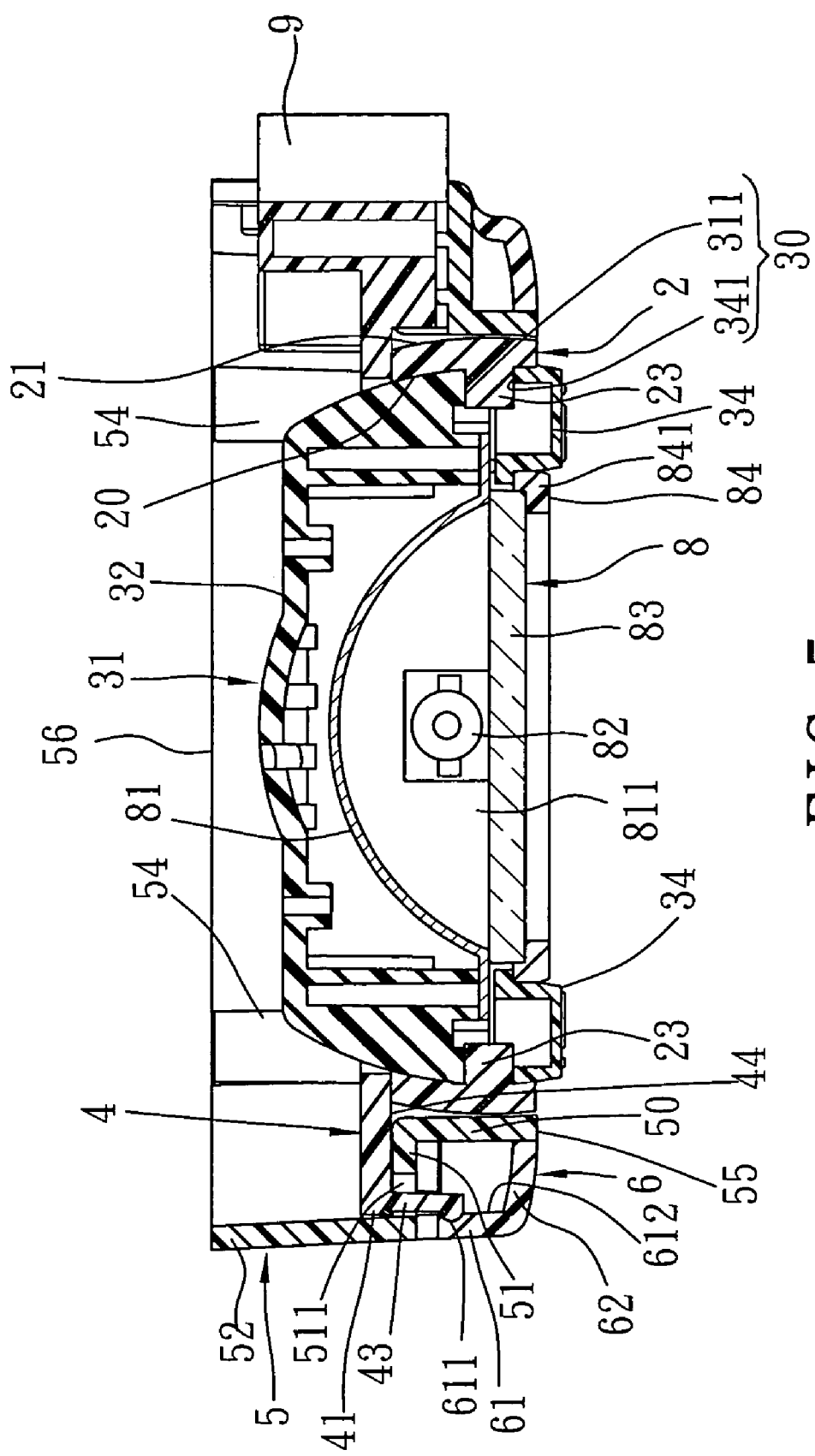
FIG. 5 is a schematic sectional view of FIG. 1 taken along line V—V.
Figure 6:
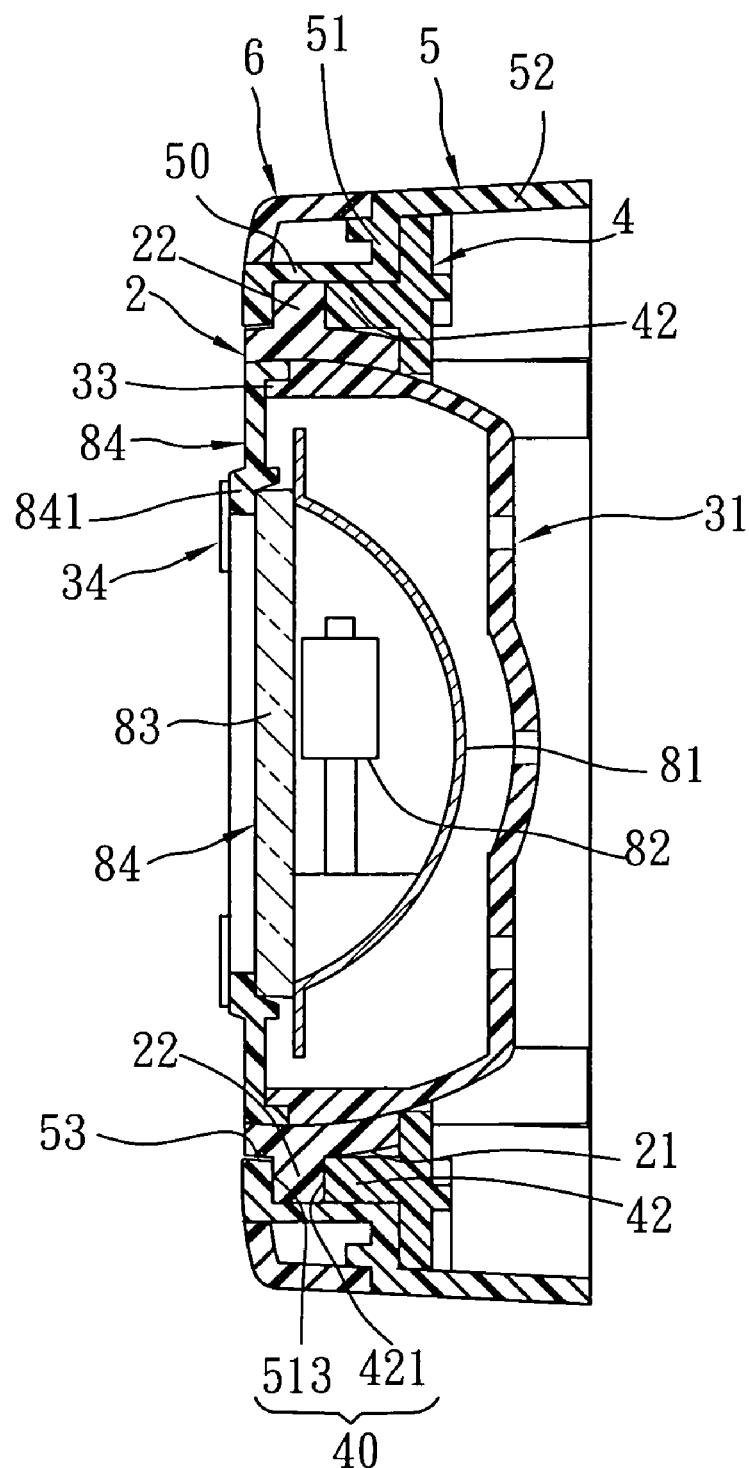
FIG. 6 is a schematic sectional view of FIG. 1 taken along line VI—VI.

The rear connecting ring 4 is mounted in the main sleeve 5. In this embodiment, the rear connecting ring 4 is disposed in the rear end portion 52 of the main sleeve 5, and has an annular front surface 44 that abuts against the intermediate shoulder portion 51 of the main sleeve 5 and that is formed with opposite pivot seats 42. The pivot seats 42 extend frontwardly, and are received respectively in the recesses 513 in the inner surface 53 of the front end portion 50 of the main sleeve 5. Each of the pivot seats 42 is formed with a pivot groove 421 that cooperates with a corresponding one of the recesses 513 in the inner surface 53 of the front end portion 50 of the main sleeve 5 so as to define a pivot hole 40 therebetween, as shown in FIG. 6. The rear connecting ring 4 has an outer periphery 41 formed with a plurality of engaging hooks 43 that are spaced apart from each other and that extend frontwardly and respectively from the outer periphery 41 through the through holes 511 in the intermediate shoulder portion 51 of the main sleeve 5, as shown in FIG. 5. The outer periphery 41 of the rear connecting ring 4 is further formed with four positioning notches 413 that engage respectively the connecting rods 54 on the main sleeve 5.

The pivot ring 2 is disposed in the main sleeve 5, and has an annular outer surface 21 formed with two aligned first pivot shafts 22 that extend radially and outwardly away from each other and that are mounted rotatably between the main sleeve 5 and the rear connecting ring 4 by engaging pivotally and respectively the pivot holes 40, which are defined by the pivot grooves 421 in the pivot seats 42 on the rear connecting ring 4 and the recesses 513 in the inner surface 53 of the front end portion 50 of the main sleeve 5, as shown in FIG. 6. As such, the pivot ring 2 is pivotable relative to an assembly of the main sleeve 5 and the rear connecting ring 4 about the first pivot shafts 22. The pivot ring 2 further has annular inner surface 20 formed with two aligned second pivot shafts 23 that extend inwardly and radially toward each other and that are perpendicular to the first pivot shafts 22.

The lamp-mounting unit 3 is disposed in the main sleeve 5, and is rotatable about the second pivot shafts 23 of the pivot ring 2. In this embodiment, the lamp-mounting unit 3 includes a lamp-mounting seat 31, and a pair of operating plate members 34. The lamp-mounting seat 31 is bowl-shaped, and has an annular front edge 310 formed with two first notches 311 opposite to each other, as shown in FIG. 2. The lamp-mounting seat 31 includes a bowl body 32, and two rear retaining plates 33 extending respectively, integrally and frontwardly from two opposite sides of the bowl body 32. Each of the rear retaining plates 33 is formed with two aligned ribs 331, as shown in FIG. 2. The operating plate members 34 are fixed to the lamp-mounting seat 31. In this embodiment, each of the operating plate members 34 has a rear edge 340 formed with a second notch 341 that cooperates with a respective one of the first notches 311 in the lamp-mounting seat 31 to define a pivot hole 30 therebetween. The second pivot shafts 23 on the pivot ring 2 engage pivotally and respectively the pivot holes 30 so as to allow for rotation of the lamp-mounting unit 3 about the second pivot shafts 23, as shown in FIG. 5.

Figure 3:
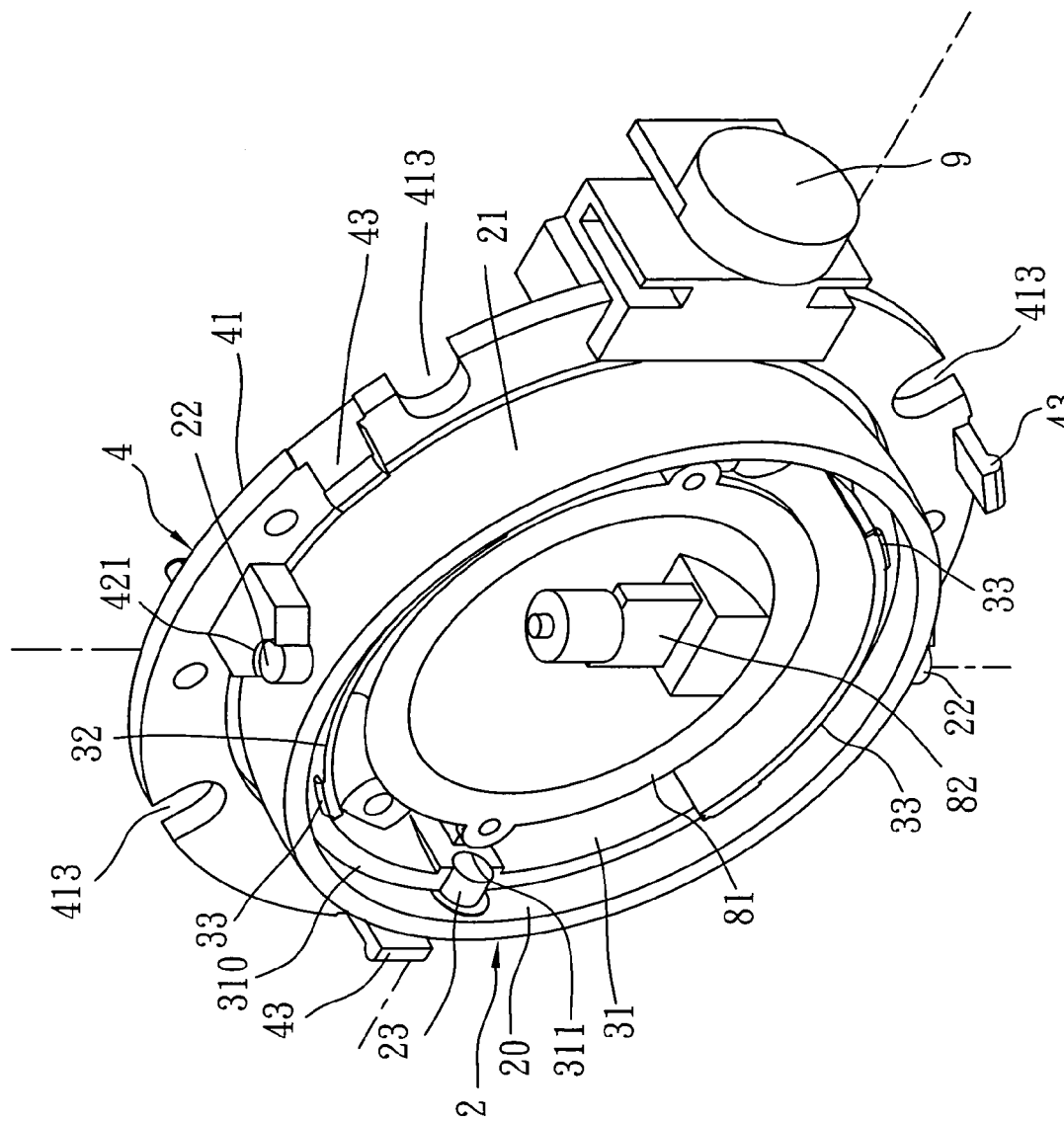
FIG. 3 is a perspective view showing an assembly of a rear connecting ring, a pivot ring, a lamp-mounting seat, a reflector and a lamp set of the preferred embodiment.
Figure 4:
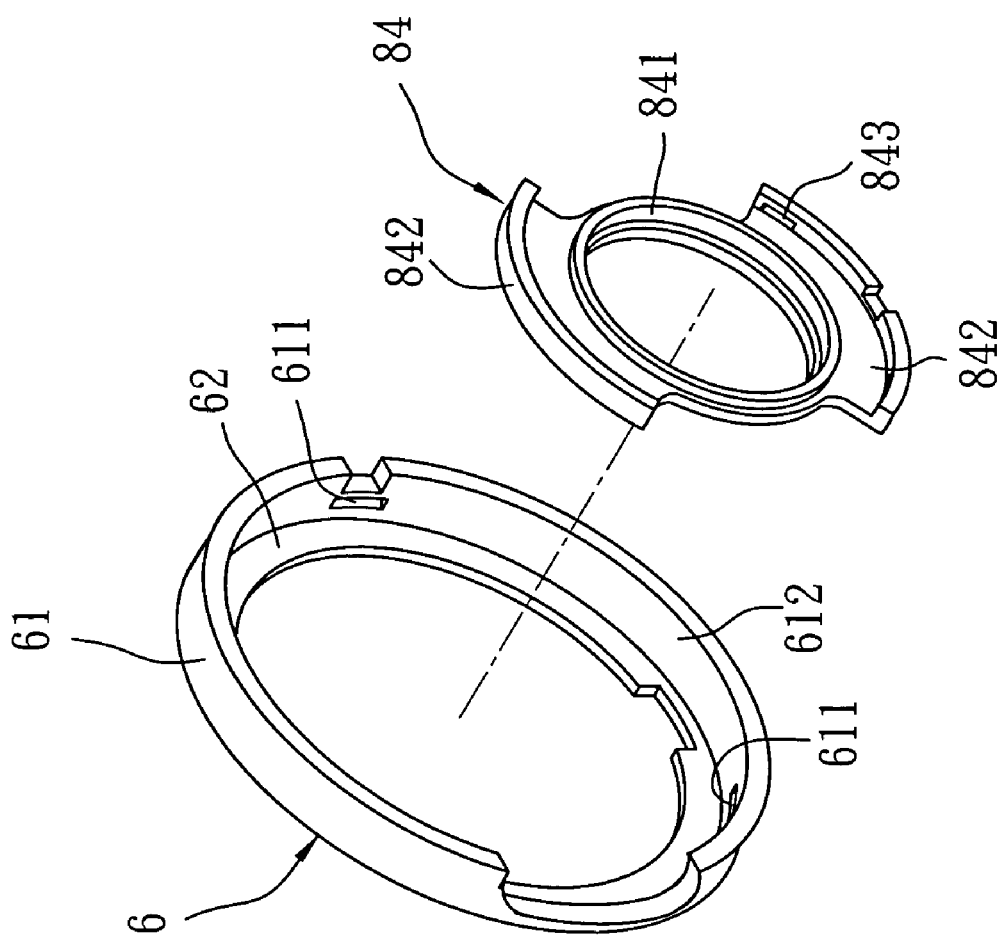
FIG. 4 is an exploded perspective showing a front decorative ring and a lens-anchoring frame of the preferred embodiment.

The lamp unit 8 is disposed in the front axial end 55 of the main sleeve 5, and is mounted fixedly on the lamp-mounting unit 3 such that an assembly of the lamp-mounting unit 3 and the lamp unit 8 is pivotable relative to the pivot ring 2 about the second pivot shafts 23. In this embodiment, the lamp unit 8 includes a bowl-shaped reflector 81 mounted in the lamp-mounting seat 31 and having a front open end 811, a lamp set 82, such as a halogen lamp set, mounted in the reflector 81 (see FIG. 3), a lens 83 mounted on the front open end 811 of the reflector 81, and a lens-anchoring frame 84 for anchoring the lens 83 to the front open end 811 of the reflector 81. In this embodiment, the lens-anchoring frame 84 includes an annular frame body 841 disposed in front of and abutting against the lens 83, as shown in FIGS. 5 and 6, and two front retaining plates 842 extending respectively, integrally and rearwardly from two opposite sides of the frame body 841. Each of the front retaining plates 842 is formed with two aligned grooves 843 (only one is illustrated in FIG. 4). The grooves 843 in each front retaining plate 842 of the lens-anchoring frame 84 engage respectively the ribs 331 on a corresponding one of the rear retaining plates 33 of the lamp-mounting seat 31 so as to confine the lens 83 and the reflector 81 between the lamp-mounting seat 31 of the lamp-mounting unit 3 and the lens-anchoring frame 84 and between the front retaining plates 842, as best shown in FIG. 6.

In this embodiment, the front decorative ring 6 is disposed on the front axial end 55 of the main sleeve 5. The front decorative ring 6 includes an annular wall 61 having an annular inner surface 612 that is formed with a plurality of engaging grooves 611 (see FIG. 4) engaging respectively the engaging hooks 43 on the rear connecting ring 4 so as to prevent removal of the rear connecting ring 4 from the main sleeve 5.

The activating unit 9 is mounted on the rear connecting ring 4, and is disposed in the mounting groove 521. The activating unit 9 is connected electrically to the lamp set 82 of the lamp unit 8 for controlling activation of the lamp set 82 of the lamp unit 8.

In such a configuration, by operating the operating plate members 34 of the lamp-mounting unit 3, orientation of the lamp-mounting unit 3 mounted with the lamp unit 8 can be changed as required. Furthermore, since the activating unit 9 is directly mounted on the main sleeve 5, activation of the lamp device can be easily controlled accordingly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A lamp device comprising:
   a main sleeve having opposite front and rear axial ends;
   a rear connecting ring mounted in said main sleeve;
   a pivot ring disposed in said main sleeve and having an annular outer surface formed with two aligned first pivot shafts that extend radially and outwardly away from each other and that are mounted rotatably between said main sleeve and said rear connecting ring such that said pivot ring is pivotable relative to an assembly of said main sleeve and said rear connecting ring about said first pivot shafts, said pivot ring further having an annular inner surface formed with two aligned second pivot shafts that extend inwardly and radially toward each other and that are perpendicular to said first pivot shafts;
   a lamp-mounting unit disposed in said main sleeve and rotatable about said second pivot shafts of said pivot ring; and
   a lamp unit disposed in said front axial end of said main sleeve and mounted fixedly on said lamp-mounting unit such that an assembly of said lamp-mounting unit and said lamp unit is pivotable relative to said pivot ring about said second pivot shafts.

2. The lamp device as claimed in claim 1, wherein said rear connecting ring has an annular front surface formed with opposite pivot seats that extend frontwardly, each of said pivot seats being formed with a pivot groove that cooperates with said main sleeve to define a first pivot hole for engaging pivotally a respective one of said first pivot shafts of said pivot ring.

3. The lamp device as claimed in claim 2, wherein said main sleeve has an annular inner surface formed with opposite recesses that are disposed adjacent to said front axial end of said main sleeve for respectively receiving and cooperating with said pivot seats so as to define first pivot hole.

4. The lamp device as claimed in claim 1, wherein:
   said rear connecting ring has an outer periphery formed with a plurality of engaging hooks spaced apart from each other and extending frontwardly from said outer periphery;
   said main sleeve has a smaller-diameter front end portion, a larger-diameter rear end portion having an inner diameter larger than that of said front end portion, and an intermediate shoulder portion interconnecting said front and rear end portions, said intermediate shoulder portion being formed with a plurality of through holes corresponding respectively to said engaging hooks on said rear connecting ring and permitting respectively said engaging hooks on said rear connecting ring to extend therethrough; and
   said lamp device further comprises a front decorative ring disposed on said front axial end of said main sleeve and including an annular wall having an annular inner surface that is formed with a plurality of engaging grooves engaging respectively said engaging hooks on said rear connecting ring so as to prevent removal of said rear connecting ring from said main sleeve.

5. The lamp device as claimed in claim 1, wherein said lamp-mounting unit includes:
 a lamp-mounting seat; and
 a pair of operating plate members fixed to said lamp-mounting seat, each of said operating plate members cooperating with said lamp-mounting seat to define a second pivot hole therebetween, said second pivot shafts on said pivot ring engaging pivotally and respectively each such second pivot hole so as to allow for rotation of said lamp-mounting unit about said second pivot shafts.

6. The lamp device as claimed in claim 5, wherein:
 said lamp-mounting seat is bowl-shaped, and has an annular front edge formed with two first notches opposite to each other; and
 each of said operating plate members has a rear edge formed with a second notch that cooperates with a respective one of said first notches in said lamp-mounting seat to define a corresponding one of such second pivot hole.

7. The lamp device as claimed in claim 6, wherein said lamp-mounting unit includes:
 a bowl-shaped reflector mounted in said lamp-mounting seat of said lamp-mounting unit and having a front open end;
 a lamp set mounted in said reflector;
 a lens mounted on said front open end of said reflector; and
 a lens-anchoring frame for anchoring said lens to said front open end of said reflector.

8. The lamp device as claimed in claim 7, wherein:
 said lamp-mounting seat of said lamp-mounting unit includes a bowl body, and two rear retaining plates extending respectively, integrally and frontwardly from two opposite sides of said bowl body, each of said rear retaining plates being formed with two aligned ribs; and
 said lens-anchoring frame includes an annular frame body disposed in front of and abutting against said lens, and two front retaining plates extending respectively, integrally and rearwardly from two opposite sides of said frame body, each of said two front retaining plates being formed with two aligned grooves, said two aligned grooves in each of said two front retaining plates of said lens-anchoring frame engaging respectively said two aligned ribs on a corresponding one of said rear retaining plates of said lamp-mounting seat so as to confine said lens and said reflector between said lamp-mounting seat of said lamp-mounting unit and said lens-anchoring frame and between said two front retaining plates.

9. The lamp device as claimed in claim 1, further comprising an activating unit connected electrically to said lamp-mounting unit and mounted on said rear connecting ring for controlling activation of said lamp unit.

* * * * *